US010127133B2

(12) United States Patent
Hegarty et al.

(10) Patent No.: US 10,127,133 B2
(45) Date of Patent: Nov. 13, 2018

(54) REDUNDANT INSTANCE VARIABLE INITIALIZATION ELISION

(71) Applicant: Oracle International Corporation, Redwood City, CA (US)

(72) Inventors: Chris J. Hegarty, Dublin (IE); Maurizio Cimadamore, Dublin (IE)

(73) Assignee: Oracle International Corporation, Redwood, CA (US)

(*) Notice: Subject to any disclaimer, the term of this patent is extended or adjusted under 35 U.S.C. 154(b) by 0 days.

(21) Appl. No.: 15/094,783

(22) Filed: Apr. 8, 2016

(65) Prior Publication Data

US 2017/0293547 A1    Oct. 12, 2017

(51) Int. Cl.
*G06F 9/44* (2018.01)
*G06F 11/36* (2006.01)
*G06F 8/41* (2018.01)
*G06F 8/30* (2018.01)

(52) U.S. Cl.
CPC ............ *G06F 11/3604* (2013.01); *G06F 8/37* (2013.01); *G06F 8/43* (2013.01); *G06F 8/443* (2013.01); *G06F 8/4435* (2013.01); *G06F 8/4441* (2013.01)

(58) Field of Classification Search
CPC .......... G06F 8/443; G06F 8/37; G06F 8/4435; G06F 8/4441
USPC ........................................ 717/126, 140, 141
See application file for complete search history.

(56) References Cited

U.S. PATENT DOCUMENTS

| 5,537,620 | A | 7/1996 | Breternitz, Jr. |
| 7,353,503 | B2 | 4/2008 | Nair et al. |
| 7,444,626 | B2 | 10/2008 | McIntosh et al. |
| 7,640,536 | B1 * | 12/2009 | Whalen ................... G06F 8/433 714/38.1 |

(Continued)

FOREIGN PATENT DOCUMENTS

CN            102231134 A  * 11/2011  .............. G06F 11/36

OTHER PUBLICATIONS

Nilsson et al., "Implementing Java Compilers Using ReRAGs", 2004.*

(Continued)

*Primary Examiner* — Phillip H Nguyen
(74) *Attorney, Agent, or Firm* — Robert C. Kowert; Meyertons, Hood, Kivlin, Kowert & Goetzel, P.C.

(57) ABSTRACT

A compiler, IDE or other code analyzer may determine whether an instance variable declaration assignment is redundant. The code analyzer may also take action based on that determination. A code analyzer may be able to determine with certainty that a particular instance variable initialization or assignment is definitely redundant. The code analyzer may cause a compiler to automatically elide the redundant assignment from compiled source code. The code analyzer may be able to determine with certainty that a particular assignment is definitely not redundant. Additionally, a code analyzer may not be able to determine with certainty whether an instance variable assignment is definitely redundant or definitely not redundant. Additionally, the code analyzer may report a warning or other informative message indicating the redundancy property of the assignment, thus alerting the programming to a (possibly) redundant assignment.

23 Claims, 7 Drawing Sheets

(56) References Cited

U.S. PATENT DOCUMENTS

| | | | |
|---|---|---|---|
| 8,555,266 B2 | 10/2013 | Copeland et al. | |
| 2003/0237079 A1* | 12/2003 | Aggarwal | G06F 8/433 717/158 |
| 2005/0108697 A1* | 5/2005 | Ogasawara | G06F 8/443 717/152 |
| 2007/0276647 A1* | 11/2007 | Cullen | G06F 8/443 703/22 |
| 2009/0125893 A1* | 5/2009 | Copeland | G06F 8/443 717/151 |
| 2015/0082276 A1* | 3/2015 | Balachandran | G06F 8/30 717/112 |
| 2016/0292580 A1* | 10/2016 | Sullivan | G06Q 30/0242 |
| 2017/0139681 A1* | 5/2017 | Dick | G06F 9/45516 |

OTHER PUBLICATIONS

Chiba, "Redundant Boxing Elimination by a Dynamic Compiler for Java", 2007.*
Dean et al., "Expressive, Efficient Instance Variables", 1996.*
Gwee et al., "A Software Tool for Optimal Class-Hierarchy Design Based on the Use-Relationship Among Functions and Variables", 2007.*
Yuji Chiba, "Redundant Boxing Elimination by a Dynamic Compiler for Java", 2007.*
Kosar et al., "Software Development with Grammatical Approach", 2004.*
Barry Cornelius, "Java versus C++", 1997.*
IBM Corporation, "Choosing an Optimization Level," downloaded from http://www.serc.iisc.ernet.in/facilities/ComputingFacilities/systems/cluster/xlf/html/xlfug/ug46.htm, Jun. 29, 2015, pp. 1-4.
"Optimize Options—Using the GNU Compiler Collection (GCC): 3.10 Options That Control Optimization," downloaded from https://gcc.gnu.org/onlinedocs/gcc-4.4.2/gcc/Optimize-Options.html, Jun. 29, 2015, pp. 1-34.
Martin Buchholz, "RFR: 8035284: (xs) Remove redundant null initialization,", downloaded from http://mail.openjdk.java.net/pipermail/core-libs-dev/2014-April/026399.html, Apr. 11, 2014, pp. 1-2.
"Why doesn't C# compiler optimize away duplicate local variable default value initialization?," downloaded from http://stackoverflow.com/questions/17277199/why-doesnt-c-sharp-compiler-optimize-away-duplicate-local-variable-default-valu, Jun. 29, 2015, pp. 1-2.
"Why must local variables have initial values," downaloded from http://stackoverflow.com/questions/753438/why-must-local-variables-have-initial-values/3383168#3383168, Jun. 29, 2015, pp. 1-2.

* cited by examiner

REDUNDANT INSTANCE VARIABLE INITIALIZATION ELISION

BACKGROUND

Traditionally, IDE's may provide a source code analyzer, or may include the ability to utilize an external (e.g., to plug in) an external source code analyzer. Traditional source code analyzers may analyze the initialization of instance variables within source code.

Instance variables explicitly initialized, in source code, to their default values are, in many cases, redundant, as the Java Language Specification guarantees that each instance variable is set to its appropriate default initial value, when it is created. Explicitly assigning an instance variable, in source code, with its default initial value is quite a common pattern, albeit unnecessary.

Existing source code analyzers may attempt to identify redundant assignments. However, in many cases the level of analysis provided by these source code analyzers may be very basic. In certain situations traditional source code analyzers may incorrectly identify assignments of default values as being redundant when they are not.

For example, a traditional source code analyzer may issue incorrect warnings when the following simple example pseudocode is analyzed.

```
public class RedundInit {
    {
        x = 6;
    }
    int x = 0; // this assignment is not redundant
    public static void main(String[ ] args) {
        RedundInit r = new RedundInit( );
        System.out.println(r.x);
    }
}
```

A traditional, existing, source code analyzer, such as Intellij IDEA™, may issue a redundant field initialization and recommend removing the initialization of variable 'x' to '0'. However, if the initialization is removed the program will then output an incorrect result (e.g., the program would print '6', rather than '0').

SUMMARY

Redundant Instance Variable Initialization Elision may involve extending the capabilities of a source code compiler, or other software development tools, to determine if an instance variable assignment is (possibly) redundant. A code analyzer may utilize an algorithm to determine whether an instance variable assignment that is part of the variable declaration is redundant, or possibly redundant. The code analyzer may then take some action based on that determination, such as indicating that the assignment is redundant or possibly redundant.

For instance, the code analyzer may cause the elision of the redundant initialization or assignment. In other words, the code analyzer may cause a compiler to automatically elide the redundant initialization (e.g., assignment) completely from compiled source code, according to some embodiments. In other embodiments, the code analyzer may report a warning or other informative message indicating that the assignment is (possibly) redundant—either in place of or in addition to causing the assignment to be elided.

In some embodiments, a code analyzer may be able to determine with certainty that a particular instance variable initialization or assignment is definitely redundant. Similarly, the code analyzer may be able to determine with certainty that a particular instance variable initialization or assignment is definitely not redundant. However, in some embodiments, a code analyzer may not be able to determine whether an instance variable assignment is definitely redundant or definitely not redundant. Thus, the code analyzer may determine that a particular instance variable assignment is possibly redundant and indicate, such as by causing a compiler warning to be issued, that the assignment is possibly redundant—thus, alerting the programmer to the possibility of the redundant assignment.

DETAILED DESCRIPTION OF EMBODIMENTS

Figure 1:
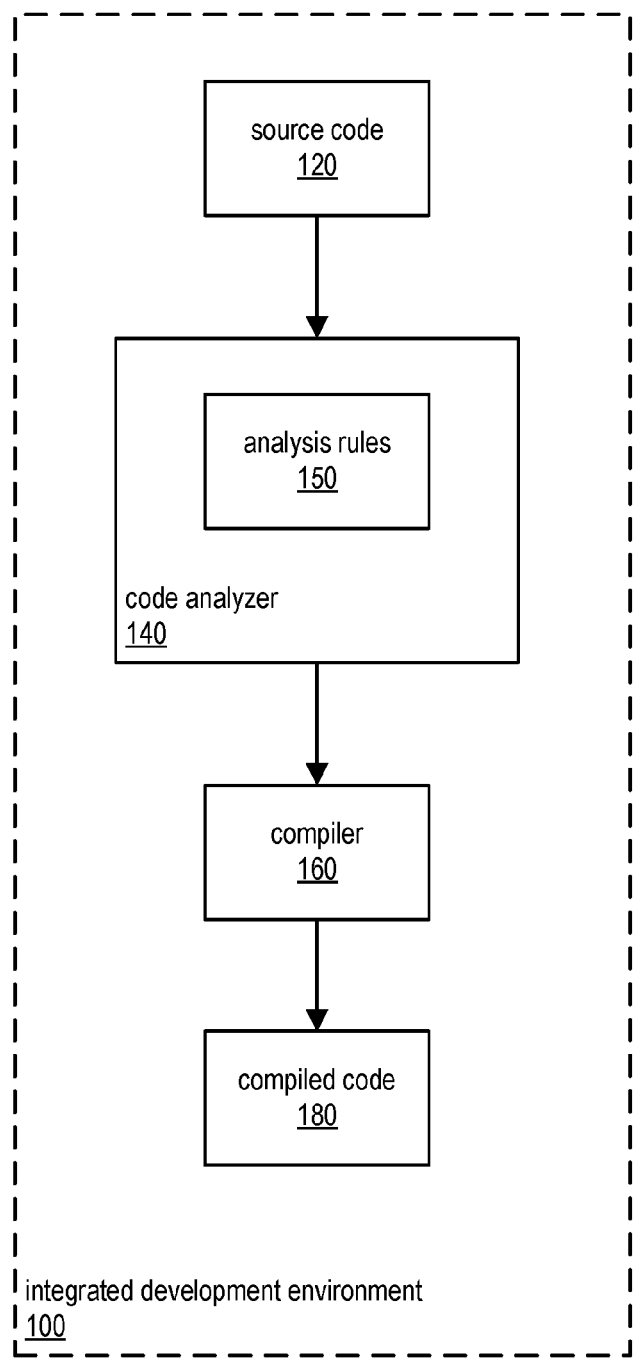
FIG. 1 is a logical block diagram illustrating a code analyzer configured to implement Redundant Instance Variable Initialization Elision, according to one embodiment.

Described herein are various methods, techniques and/or mechanisms for Redundant Instance Variable Initialization Elision. As noted above, Redundant Instance Variable Initialization Elision may involve extending the capabilities of a source code compiler, or other software development tools, to determine if an instance variable assignment is (possibly) redundant. According to some embodiments, a code analyzer may utilize an algorithm to determine whether an instance variable declaration assignment (e.g., an assignment as part of a variable declaration) assigning a default initial constant value, is definitely redundant, definitely not redundant, or possibly redundant.

The code analyzer may then take some action based on instance variable declaration assignment's redundancy property (e.g., whether it is definitely redundant, definitely not redundant, or possibly redundant). For instance, the code analyzer could cause the elision of the redundant initialization or assignment. In other words, the code analyzer may cause a compiler to automatically elide the redundant initialization (e.g., assignment) completely from compiled source code, according to some embodiments. In other embodiments, the code analyzer may report a warning or other informative message indicating that the assignment is (possibly) redundant—either in place of or in addition to causing the assignment to be elided.

In some embodiments, a code analyzer may be able to determine with certainty that a particular instance variable initialization or assignment is definitely redundant. Similarly, the code analyzer may be able to determine with certainty that a particular instance variable initialization or assignment is definitely not redundant. However, in some embodiments, a code analyzer may not be able to determine whether an instance variable assignment is definitely redundant or definitely not redundant. Thus, the code analyzer may determine that a particular instance variable assignment is possibly redundant and indicate, such as by causing a compiler warning to be issued, that the assignment is possibly redundant—thus, alerting the programmer to the possibility of the redundant assignment.

According to various embodiments, Redundant Instance Variable Initialization Elision may reduce the size of compiled source code, such that the compiled source code may require a smaller static footprint. Similarly, Redundant Instance Variable Initialization Elision may, in some embodiments, result in fewer actual byte code instructions to be executed, thus possibly increasing the performance of the compiled source code. Additionally, Redundant Instance Variable Initialization Elision may increase the readability of the source code by allowing the source code to be written with explicit default initial assignment initializers, such that the expected default value of a variable may be obvious when the source code is visually inspected.

Thus, during compilation of source code, a compiler and/or code analyzer may analyze each instance variable to determine if it is 'definitely unassigned', or 'possibly unassigned' at the point of its (i.e., the instance variable's) declaration. An instance variable that is 'definitely unassigned' at the point of its declaration, but that is explicitly assigned (i.e., in the source code as part of the declaration), to the default initial constant value for its type (e.g., as per the Java Language Specification, Chapter 4, section 12.5) can be treated by the compiler as if the assignment never happened (i.e. it can be elided) without altering the behavior of the program. In other words, if the declaration for an instance variable assigns a value to the variable that is equal to the variable type's default initial constant value, the assignment is unnecessary or redundant because the language already guarantees that the variable has that value when it is created (which may be earlier than when it is declared).

Similarly, an instance variable may be 'possibly unassigned' at the point of its declaration—that is an instance variable that has not been assigned any value between its creation and the point in the source code where it is declared. According to some embodiments, a compiler and/or code analyzer may issue a warning, hint, informational notice, etc., that a 'possibly unassigned' instance variable explicitly assigned (i.e., in the source code at the point of declaration) the default initial constant value for its type is most likely redundant.

As noted previously, Redundant Instance Variable Initialization Elision may, in some embodiments, provide several benefits. For instance, Redundant Instance Variable Initialization Elision may reduce the size of compiled source code, such that the compiled source code may require a smaller static footprint. Similarly, Redundant Instance Variable Initialization Elision may, in some embodiments, result in fewer actual byte code instructions to be executed, thus possibly increasing the performance of the compiled source code.

Additionally, Redundant Instance Variable Initialization Elision may increase the readability of the source code by allowing the source code to be written with explicit default initial assignment initializers, such that the expected default value of a variable may be obvious when the source code is visually inspected. For instance, programmers may specifically initialize instance variables. For example, a Boolean variable may be initially set to FALSE and later set to TRUE, allowing the life cycle of the variable to be clear (i.e., readable). In other words, allowing the initialization assignment to be present in the source code, even when it is elided from the compiled code may allow a person reading the source code to see the value to which a variable is initialized without having to know/remember the default (initial) values for each variable type within that programming language.

Thus, since, according to some embodiments, only the byte code redundancy is removed (i.e., the assignment may still be present in the source code) readability may be increased over not utilizing Redundant Instance Variable Initialization Elision described here and, instead, modifying the source code to directly remove the assignment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. Additionally, when used in the claims, the term "or" is used as an inclusive or and not as an exclusive or. For example, the phrase "at least one of x, y, or z" means any one of x, y, and z, as well as any combination thereof.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Turning now to FIG. 1, which shows a flowchart illustrating one embodiment of a method for Redundant Instance Variable Initialization Elision, as described herein. FIG. 1 illustrates, according to one embodiment, a workflow for compiling and executing a computer program. For purposes of illustration, the following description is provided largely in the context of using the Java' programming language. However, it is noted that the techniques described may be used with any of various programming languages that support instance variable declaration assignments and that provides default initial constant values for variables at creation and according to the variable type.

For example, various programming languages, such as Java™ and C# may give variables a default initial constant value at creation. For instance, according to the Java programming language, variables are given a type-specific default initial constant value when they are created. The listing below shows example type-specific default initial constant values according to a Java-based example:

For type 'byte', the default value is zero, that is, the value of (byte)0.

For type 'short', the default value is zero, that is, the value of (short)0.

For type 'int', the default value is zero, that is, 0.

For type 'long', the default value is zero, that is, 0L.

For type 'float', the default value is positive zero, that is, 0.0f.

For type 'double', the default value is positive zero, that is, 0.0d.

For type 'char', the default value is the null character, that is, '\u0000'.

For type 'boolean', the default value is 'false'.

For all reference types (§ 4.3), the default value is 'null'.

In various embodiments, source code 120 may be specified in various programming languages, such as Java™, C#, and/or other programming languages. For example, source code may be provided as a set of .java files in embodiments where Java' is being used. In some embodiments, source code 120 may be specified using a combination of languages, which may include one or more low-level and/or intermediate languages (e.g., assembly). In general, a class may be considered a user-defined type or data structure that may include data, variables, functions, methods and/or other attributes as members and that represents a definition, blueprint, or template, for creating programming objects of a specific type. A class may provide initial values for data members and implementations for member functions and methods. Classes are frequently included in libraries. A library may be considered a collection of resources used by software programs or applications. A library may include any of various types of resources including, but not limited to, data, documentation, classes, subroutines, and/or type specifications, according to some embodiments. A library may be organized so as to be utilized by more than one application (possibly at the same time), and may promote re-usability by providing resources so that applications may not have to implement (or re-implement) the same behavior.

The compiler 160 may analyze the source code 120 to produce an executable version of the program or bytecode files, such as compiled code 180 (e.g., .class files or jar files in the case of Java™) in the depicted embodiment. In some embodiments, compiler 160 may utilize code analyzer 140 to analyze source code 120—in part or in whole. In some embodiments, code analyzer 140 may be separate and distinct from compiler 160, while in other embodiments, code analyzer 140 may be considered a part of compiler 160. In some embodiments, code analyzer 140 and/or compiler 160 may be part of an integrated development environment, such as integrated development environment 100, configured to provide various complete software development tools.

Different types of executable code formats may be used in various embodiments. For example, binary machine language may be used instead of bytecodes. In some scenarios, parts of the executable code (e.g., compiled code 180) may be in bytecode while others are in a native binary machine language.

As part of compiling source code 120 into executable code (e.g., complied code 180), the compiler 160, and/or code analyzer 140, may perform a sequence of analysis operations on source code 120, such as to apply or implement Redundant Instance Variable Initialization Elision, according to some embodiments. For example, the code analyzer 140 and/or the compiler 160 may apply analysis rules 150 to determine that the initial assignments of one or more instance variables (at the point of their declaration) in source code 120 are redundant. Analysis rules 150 may be any form of rules, heuristics, analysis methods, etc. usable to determine whether instance variable initializations and/or assignments are definitely redundant, definitely not redundant, or possibly redundant, according to various embodiments. Analysis rules 150 may vary from programming language to programming language and may be specific for a particular programming language, according to various embodiments.

Thus, Redundant Instance Variable Initialization Elision, as described herein, may, according to various embodiments, identify three different categories of instance variable initialization assignment: 1) definitely redundant and it can be safely omitted from a compiled version of the code, 2) definitely not redundant because the code analyzer encounters a modification to the instance variable and no warnings may be generated, 3) possibly redundant where it is not possible to determine statically that there is no modification to the instance variable, but in which there may not actually be a modification to the instance variable at runtime.

While illustrated as being a part of code analyzer 140, in some embodiments, analysis rules 150 (as well as possibly code analyzer 140) may be part of compiler 160 and/or integrated development environment 100. In one embodiment, analysis rules 150 may represent logic coded as part of code analyzer 140, while in other embodiments, analysis rules 150 may represent a data structure encoding logic accessible and usable by code analyzer 140.

In response to determining that a particular assignment is definitely redundant, code analyzer 140 may perform one or more actions, such as issuing a developer warning through integrated development environment 100, communicating a compiler hint to compiler 160, and/or causing compiler 160 to automatically omit the redundant assignments from the compiled code 180 (e.g., without requiring any developer action), according to various embodiments.

As shown in FIG. 1, a code analyzer 140 may access source code 120 in order to, among other things, identify redundant instance variable initializations, according to some embodiments. If an instance variable initialization is determined to be redundant (e.g., definitely redundant), code analyzer may indicate the initialization's redundancy in any of various ways, according to different embodiments. Additionally, code analyzer 140 may inform compiler 160 (e.g., via any of various ways) and compiler 160 may omit the redundant assignment when generating compiled code 180 from source code 120. For instance, compiler 160, may omit the assignment in response to the indication that the initialization was redundant, according to one embodiment.

Code analyzer 140 may represent any of various types of code analyzers, such as a stand-alone code analyzer, an IDE-based code analyzer, a compiler-based code analyzer, etc., according to various embodiments. Thus, in some embodiments, code analyzer 140 may be separate from compiler 160, but in other embodiments, code analyzer 140 may be part of compiler 160. In yet other embodiments, code analyzer 140 and compiler 160 may be part of an IDE, such as integrated development environment 100, as shown in FIG. 1.

As noted above, many traditional IDE's and/or other code analysis tools implement a very simply technique for detecting redundant assignments. Whenever it is found that a field is being initialized to its default value, a traditional IDE and/or code analysis tool may generate a warning. However, as will be described in more detail below, there is an entire class of problems where the initialization may actually be needed, even if the variable is being initialized to its default initial constant value. For example, in some embodiments, the field (e.g., variable) may have changed between the time it was created (and given its default initial constant value) and the time is declared and initially assigned.

Traditionally, code analysis tools may only provide warnings regarding redundant initializations without actually determining whether a particular instance variable initialization is definitely redundant. Additionally, existing code analysis tools do not elide (e.g., automatically) a redundant assignment from complied code. Furthermore, traditional IDEs and/or code analysis tools also frequently generate incorrect warnings that particular assignments are redundant in situations where the initialization is actually required for proper functioning of the compiled code. Thus, in some cases existing code analysis tools may provide incorrect warnings that lead a developer to think that a particular variable initialization may be removed from the source code, however, removing the initialization may cause problems in the execution of the compiled code because the initialization was not actually redundant.

According to some embodiments, Redundant Instance Variable Initialization Elision may be used with, or as part of, various tools, such as code analyzer 140, compiler 160, integrated development environment 100, and/or virtually any other tool that provides code analysis. In some embodiments, a tool configured to implement Redundant Instance Variable Initialization Elision may modify the code (e.g., the source code 120 and/or the compiled code 180). In other embodiments however, a tool configured to implement Redundant Instance Variable Initialization Elision may not modify any code, but instead may be configured to provide more accurate information (e.g., to a user or developer) regarding initialization and assignments in the code. For instance, the code analyzer 140 may provide a user information regarding the redundancy property (e.g., whether redundant or not) of various instance variable initializations assignments in source code 120.

As described above, many programming languages, such as the Java™ programming language uses various default assignments to variables. For instance, the Java programming language utilizes various default values for variables according to the type of the variable. For instance, a programming language may use one default value for one variable type, while using a different default value for a different variable type. Some programming languages guarantee that a variable, such as an instance variable, is assigned a default value prior to any use of that variable during code execution.

Thus, if the declaration of a particular instance variable includes an assignment of the variable's default value to the variable, the actual assignment at the point of the declaration may be redundant, since the programming language may already guarantee that the variable has the default value.

For example, the following example Java pseudocode illustrates a redundant instance variable assignment (or initialization).

Example 1

```
class Foo {
    int bar = 0;
}
```

In the example above, the assignment of '0' to the instance variable 'bar' is redundant, since, the Java programming language, according to the Java Language Specification (JLS) guarantees that the value of 'bar' will be '0', when it is created. Thus, in some embodiments, if source code including the code of the above example were analyzed by code analyzer 140 (e.g., a code analyzer configured to implement Redundant Instance Variable Initialization Elision), code analyzer 140 may determine that the assignment of '0' to the instance variable 'bar' is redundant and may, in response, indicate the redundant property of the assignment. For instance, in one embodiment, the code analyzer 140 may communicate with compiler 160, such as via a compiler hint, to indicate that the assignment of '0' to the instance variable 'bar' at the point of declaration is redundant and may be omitted from a compiled version of the source code 150. In response to the indication that the instance variable assignment is redundant the compiler 160 may omit the assignment from compiled code 180, according to one embodiment.

Similarly, the following example Java pseudocode illustrates multiple instance variable initial assignments that are all redundant, according to one example embodiment.

Example 2

```
class Baz {
    byte b = (byte)0;      // aload_0 iconst_0   putfield idx1 idx2
    short s = (short)0;    // aload_0 iconst_0   putfield idx1 idx2
    int i = 0;             // aload_0 iconst_0   putfield idx1 idx2
    long l1 = 0L;          // aload_0 lconst_0   putfield idx1 idx2
    float f = 0.0f;        // aload_0 fconst_0   putfield idx1 idx2
    double d = 0.0d;       // aload_0 dconst_0   putfield idx1
                                                 idx2
    char c = '\u0000';     // aload_0 iconst_0   putfield idx1 idx2
    boolean bo = false;    // aload_0 iconst_0   putfield idx1
                                                 idx2
    Object obj = null;     // aload_0 aconst_null putfield idx1
                                                 idx2
}
```

In the above example, the assignments of all the instance variables in 'Baz' are redundant. Additionally, in a Java based embodiments, the assignments may typically translate to five bytes of code, per assignment, per instance constructor, in the compiled source code. The comments in the above example, illustrate typical byte codes of compiled source code for the assignments, according to a Java-based embodiment.

The two examples above are similar to each other, each showing an example of an assignment to a default initial constant value that is redundant and which may be removed from the compiled version of the source code without affecting the behavior of the compiled code, according to some embodiments. Both of the above examples illustrates situations in which code analyzer 140 may positively determine that the instance variable declaration assignment is definitely redundant and may be safely (i.e., in terms of execution behavior) removed from the compiled code. As will be discussed in more detail below, according to some embodiments, a compiler 160 may automatically omit a definitely redundant assignment a compiled version of the source code 120, such as from compiled code 180, without requiring the developer to actually remove the assignment from the source code (as is frequently required by traditional code analysis tools).

The following example Java pseudocode illustrates an additional instance variable initial assignment that is redundant, according to one example embodiment.

Example 3

```
class Foo {
    {
        noOp( );
    }
    int bar = 0;
    private final void noOp( ) { }
}
```

In the above Java-based example, the assignment of '0' to the instance variable 'bar' is 'probably redundant', (since the Java Programming Language, according to the JLS, may guarantee that the value of 'bar' will be '0' when it is created). In fact, in the above example embodiment, the assignment to 'bar' is redundant, as the method 'noOp' does not assign any value to it. Thus, in one embodiment, code analyzer 140 may, when analyzer source code illustrated by the above example, determine that the initial assignment of '0' to instance variable 'bar' is redundant.

Not every initial assignment of an instance variable may be redundant, however. For example, if an instance variable is initially assigned (at the point of declaration) a value other than its initial default constant value, a code analyzer, such as code analyzer 140, may determine that the initial assignment of the variable is not redundant, according to some embodiments.

Additionally, many programming languages may allow various types of programming instructions, structures, constructions, models, execution paths, etc., permitting an instance variable to be modified prior to the actual declaration of that variable in the code. For instance, an instance initializer and/or instance variable initializer may change the value of an instance variable before the point (e.g., in terms of execution) of the variable actual declaration and initial assignment. Thus, if the instance variable is initially assigned (i.e., at the point of declaration) to the default initial constant value for the relevant type, that assignment may not be redundant because the instance (variable) initializer may have previously modified (e.g., assigned a value to) the variable (and thus, the initial assignment is 'resetting' the variable to its default initial constant value, according to one example embodiment.

For instance, in a Java-based embodiment, whenever a field contains an assignment, such as variable 'bar' in the above example, the assignment may be copied to by the compiler into the constructor(s) of the class, such as within the constructor of class 'Foo' above. Thus, the constructor of class 'Foo' would contain a call to noOp( ) and then an assignment to 'bar'. Every time an instance of 'Foo' is created, there would be a method call and an assignment of '0' to variable 'bar'. However, when the method is called, the logic inside the method may also perform assignments to the variable 'bar'. For instance, the body of the method noOp( ) could include the assignment "bar=5" making the initialization of 'bar' as part of its declaration (e.g. "int bar=0;" no longer redundant. Instead, the initialization would be resetting the value of variable 'bar' back to '0', according to one example embodiment.

For instance, the following example Java pseudocode illustrates an instance variable initial assignment that is not redundant, according to one example embodiment.

Example 4

```
class Foo {
    {
        setBar( );
    }
    int bar = 0;
    private final void setBar( ) { bar = 5; }
}
```

In the above example, the assignment of '0' to the instance variable 'bar' is NOT redundant. It is necessary, for correctness, that 'bar' is set to '0' at the point in the source code where it is declared, according to the above example embodiment. Thus, code analyzer 140, when analyzing code according to the above example, may determine that the initial assignment of '0' to variable 'bar' at the point of declaration is not redundant, according to some embodiments.

In cases where a method call is made within a constructor, as in the above example, the code analyzer 140 may not be able to determine the exact instructions to be executed within the body of method call, depending on the nature of the method, according to some embodiments. For instance in the Java-based example above, the method setBar( ) is both private and final. Since the method setBar( ) is private and no overriding can take place (e.g., there is only one method body that can be called), code analyzer 140 may determine the result of the method. Thus, code analyzer 140 may look inside the body of the method to determine if any instruction affects the variable 'bar'. Since, the body of method setBar( ) includes the instruction, "bar=5", code analyzer 140 may determine that the initialization of 'bar' during its declaration is definitely not redundant, according to one example embodiment. Conversely, referring back to Example 3 above, since the body of method noOp( ) is empty, code analyzer 140 may determine that the initialization of variable 'bar' (in Example 3) is definitely redundant, according to one example embodiment.

However, in some cases a method called as part of an instance initializer (or an instance variable initializer) may be overridable (e.g., it may not be final or private). In some embodiments, there may be one or more overridable methods called as part of an initializer. When such a method may be overridden, one version may modify the value of an instance variable and another may not. In some embodiments, code analyzer 140 may not be able to determine exactly which method body may be executed at runtime, and may not be able to determine whether or not a particular instance variable assignment will be redundant during execution because it may be impossible to determine which method body will be executed.

Additionally, in some cases, an instance variable may be modified via a reference. In such a case there may not be a method call. For instance, an instance variable may be modified via a reference pointer to the object containing the instance variable. The following example Java pseudocode illustrates another example of a non-redundant instance variable initialization assigning the variable's default initial constant value when it is declared.

Example 5

```
class Foo {
    {
        Foo fooRef = this;
        fooRef.bar = new Object( );
    }
    Object bar = null;
}
```

In the example above, the assignment of 'null' to the instance variable 'bar' is NOT redundant. As shown above, a variable, 'fooRef', gets assigned 'this' which is the instance being created. In some programming languages this may be referred to as 'aliasing'. The 'forRef' variable may be used to modify the value of variable 'bar', as shown in the above example. Thus, the variable 'bar' may be modified through an intermediate variable that points to the same instance that is being created. Subsequently, the variable 'bar' may be assigned the value of 'null' (e.g., the default initial constant value for its type).

In this example case, the assignment (e.g., of 'null' to 'bar') is not redundant because 'bar' is changed in the code prior to its initial assignment at the point when it is declared. If the assignment of 'null' to 'bar' were to be removed, the example code would not function correctly. For correctness 'bar' is set to 'null' at the point in the source code where it is declared, according to the example embodiment.

However, in some embodiments code analyzer 140 may not be able to determine for certain whether an instance variable initial assignment is definitely redundant, such as with the aliasing example illustrated in the above example. Thus, according to some embodiments, code analyzer 140 may be configured to indicate that a particular instance variable initialization is possibly redundant and that it cannot be determined with certainty whether the initial assignment is definitely redundant or not. In other words, there may be some situations where a code analyzer 140 may not be able to tell from code analysis whether an assignment is necessarily redundant or not, in which case the code analyzer 140 may identify the assignment as possibly redundant and/or issue some sort of warning, note, compiler hint, etc.

Redundant Instance Variable Initialization Elision, as described herein, may involve more than one type of code analysis. For ease of discussion the analysis utilized by Redundant Instance Variable Initialization Elision may be considered to divide the problem space into two stages. For instance, the first stage of analysis may identify simple cases in which code analyzer 140 may be able to determine for certain whether an assignment is definitely redundant or definitely not redundant. The second stage of analysis may be utilized in cases when it cannot easily be determined whether an assignment is redundant or not. For instance, Examples 1 and 2 above may fall into the first situation and the redundancy property of the assignments may be determined by the first (logic) stage of analysis, but Examples 3 and 4 may fall into the second situation and the redundancy property of the assignments may be determined by the second (logic) stage of analysis. Note that the code analysis described herein in only divided into separate stages for ease of discussion and no real separation may occur when implementing Redundant Instance Variable Initialization Elision, according to various embodiments.

In many situations, the analysis may be utilized to determine with certainty whether an assignment (e.g., an instance variable initial assignment as the point of declaration) is redundant. Additionally, a set of rules (e.g., heuristics), such as analysis rules 150, may be utilized to identify an assignment as potentially being redundant (e.g., possibly redundant). Thus, tools implementing Redundant Instance Variable Initialization Elision, such as code analyzer 140, may be able to clearly indicate to a developer the specific category (e.g., definitely redundant, definitely not redundant, or possibly redundant) into which a particular assignment falls.

Figure 2:
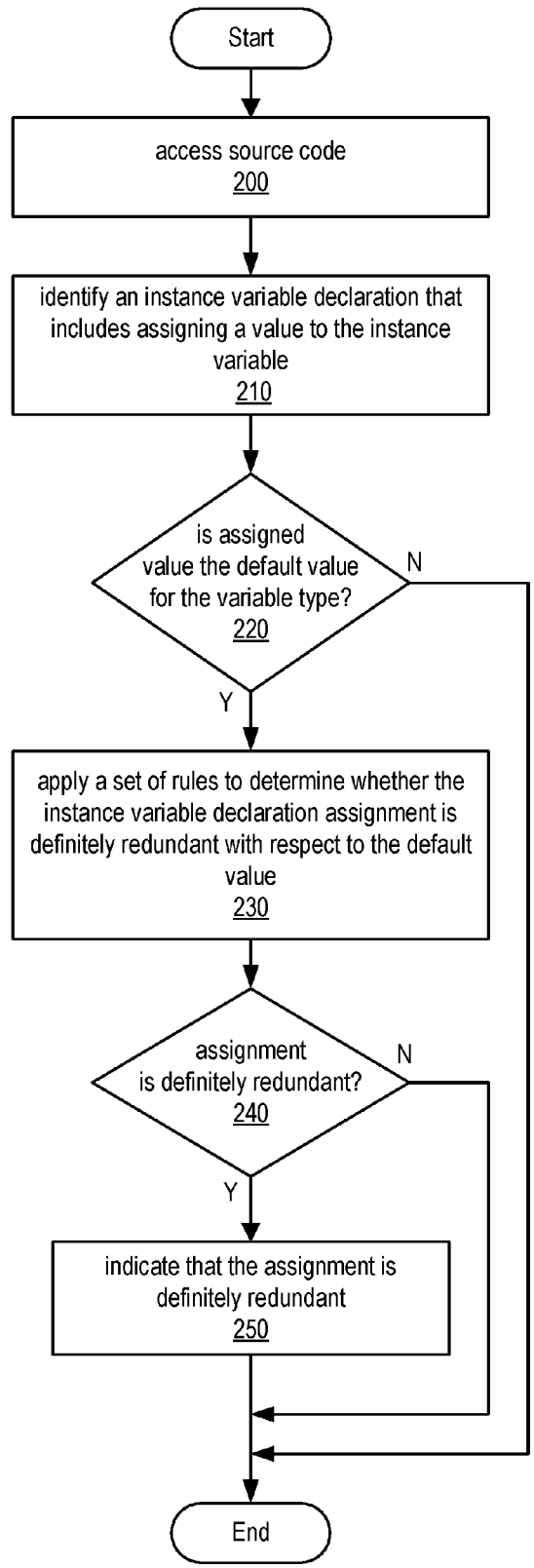
FIG. 2 is a flowchart illustrating one embodiment of a method for Redundant Instance Variable Initialization Elision, as described herein.

FIG. 2 is a flowchart illustrating one embodiment of a method for Redundant Instance Variable Initialization Elision, as described herein. As shown in block 200, a code analyzer, such as code analyzer 140, may access source code, such as source code 120 and may identify an instance variable declaration that includes an assignment assigning a value to the instance variable, as shown in block 210.

If the value assigned to the instance variable at the point of declaration (i.e., the assigned value) is the default initial constant value for the variable type, as shown by the positive output of decision block 220, code analyzer 140 may apply analysis rules 150, to determine whether the instance variable declaration assignment is definitely redundant with respect to the default initial constant value, as shown in block 230. When applying analysis rules 150, code analyzer 140 may apply any of various methods of analysis, such as the two logical stages of code analysis described above. For instance, code analyzer 140 may first determine whether the instance variable declaration under analysis falls under one of the simple categories, such as those described regarding Examples 1 and 2, above, according to one embodiment.

If the code analyzer 140 determines that the assignment is definitely redundant, as illustrated by the positive output of decision block 240, the code analyzer 140 may indicate that the assignment is definitely redundant, as shown in block 250, according to some embodiments. For example, in one embodiment, in response to determining that an assignment is definitely redundant, code analyzer 140 may issue a warning, such as a user/developer warning, compiler hint, etc., indicating that the assignment is definitely redundant and may also recommend that the assignment can be omitted.

In other embodiments, code analyzer 140 may communicate directly to compiler 160 to enable compiler 160 to omit the definitely redundant assignment from compiler code 180. For example, compiler 160 may, as part of compiling source code 120, initiate analysis of source code 120 by code analyzer 140. In turn, code analyzer 140 may return information indicating one or more definitely redundant assignments, and compiler 160 may then omit those definitely redundant assignments from compiled code 180.

However, if the assigned value (e.g., the value assigned to the variable) is not the variable's default initial constant value, as indicated by the negative output of decision block 220, code analyzer 140 may not need to apply analysis rules 150, because the fact that it is being assigned a value other that the default initial constant value may be enough for code analyzer 140 to determine that the assignment is definitely not redundant.

If, as indicated by the negative output of decision block 240, the assignment is not definitely redundant, code analyzer 140 may then apply additional analysis to determine whether the assignment is redundant or not, as will be described below regarding FIGS. 3-5, below.

Figure 3:
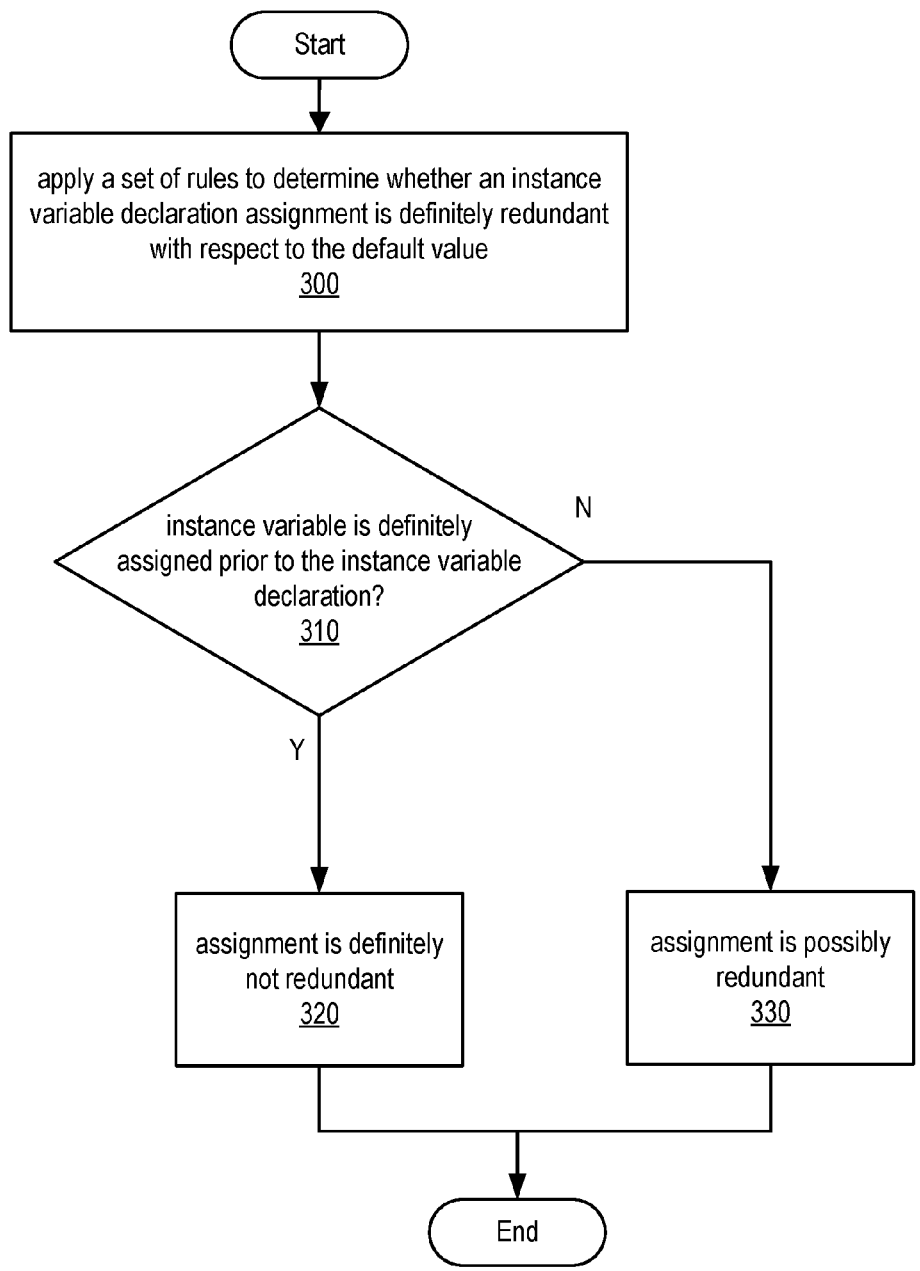
FIG. 3 is a flowchart illustrating one embodiment of a method for determining whether an instance variable assignment is redundant, as described herein.

FIG. 3 is flowchart illustrating one embodiment of a method for determining whether an instance variable assignment is redundant, as described herein. As described above, a code analyzer configured to implement Redundant Instance Variable Initialization Elision, such as analyzer 140, may apply analysis rules 150 to determine whether an instance variable declaration assignment is definitely redundant with respect to a default initial constant value for the variable's type, as shown in block 300.

If, as indicated by the positive output of decision block 310, the code analyzer 140 determines that the instance variable is definitely assigned prior to the instance variable declaration, the code analyzer 140 may determine that the instance variable declaration assignment is definitely not redundant, as shown in block 320.

In some embodiments, code analyzer 140 may apply a set of rules, such as may be part of analysis rules 150, to determine whether an instance variable is definitely assigned prior to the variable's declaration. For instance, in one Java-based embodiment, code analyzer 140 may be configured to follow the logic described in the Java Language Specification (e.g., chapter 16) to determine whether the instance variable is definitely assigned prior to the variable's declaration. For example, code analyzer 140 may examine each method body that may be called from the class instance (variable) initializer to determine whether any instruction modifies the instance variable. If a method body (for a method executed prior to the variable's declaration) includes an instruction that modifies the variable (or causes the variable to be modified) code analyzer 140 may determine that the instance variable is definitely assigned prior to its declaration.

Figure 4:
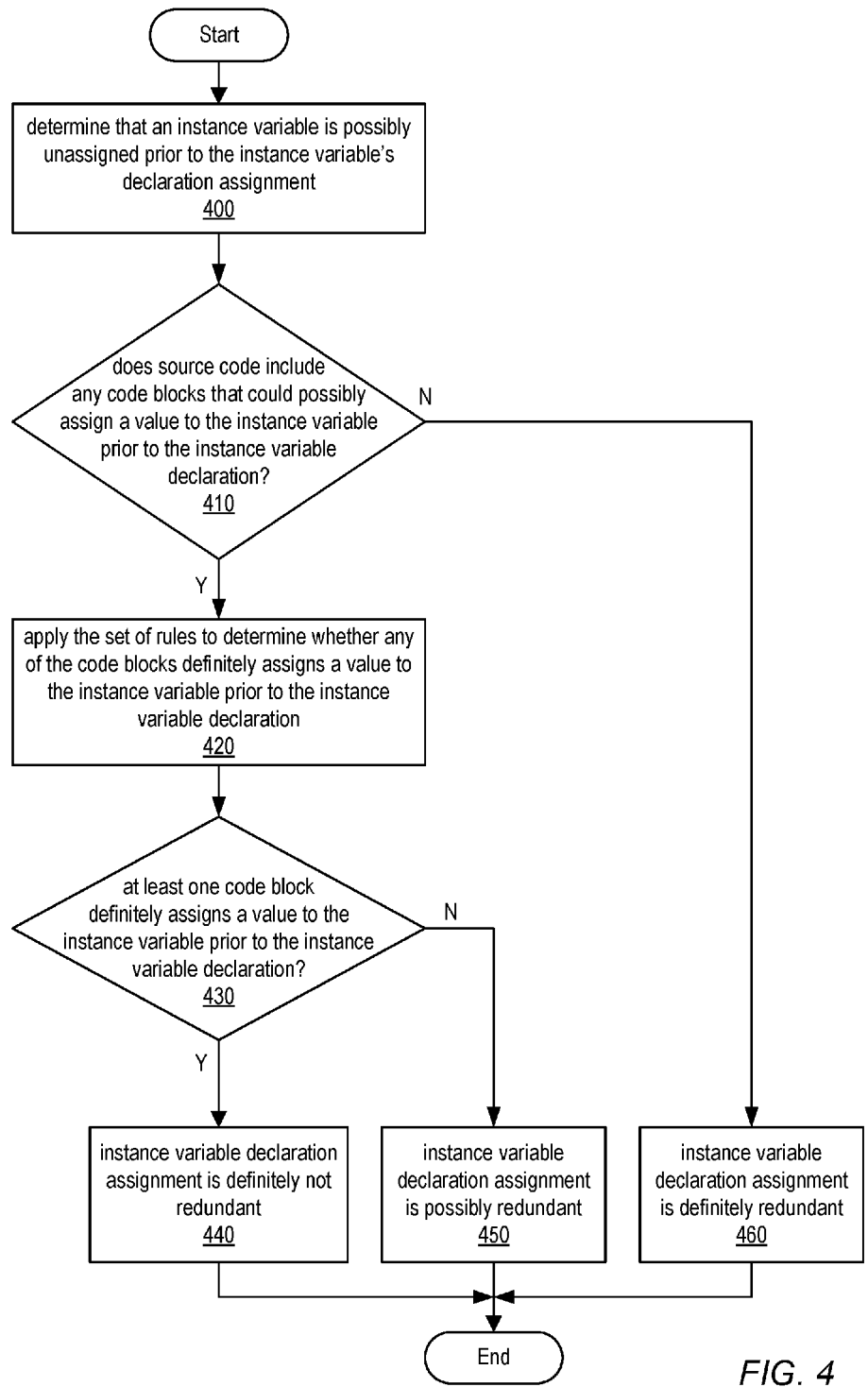
FIG. 4 is a flowchart illustrating one embodiment of a method for determining the redundancy property of an initial assignment for a possibly unassigned instance variable, as described herein.
Figure 5:
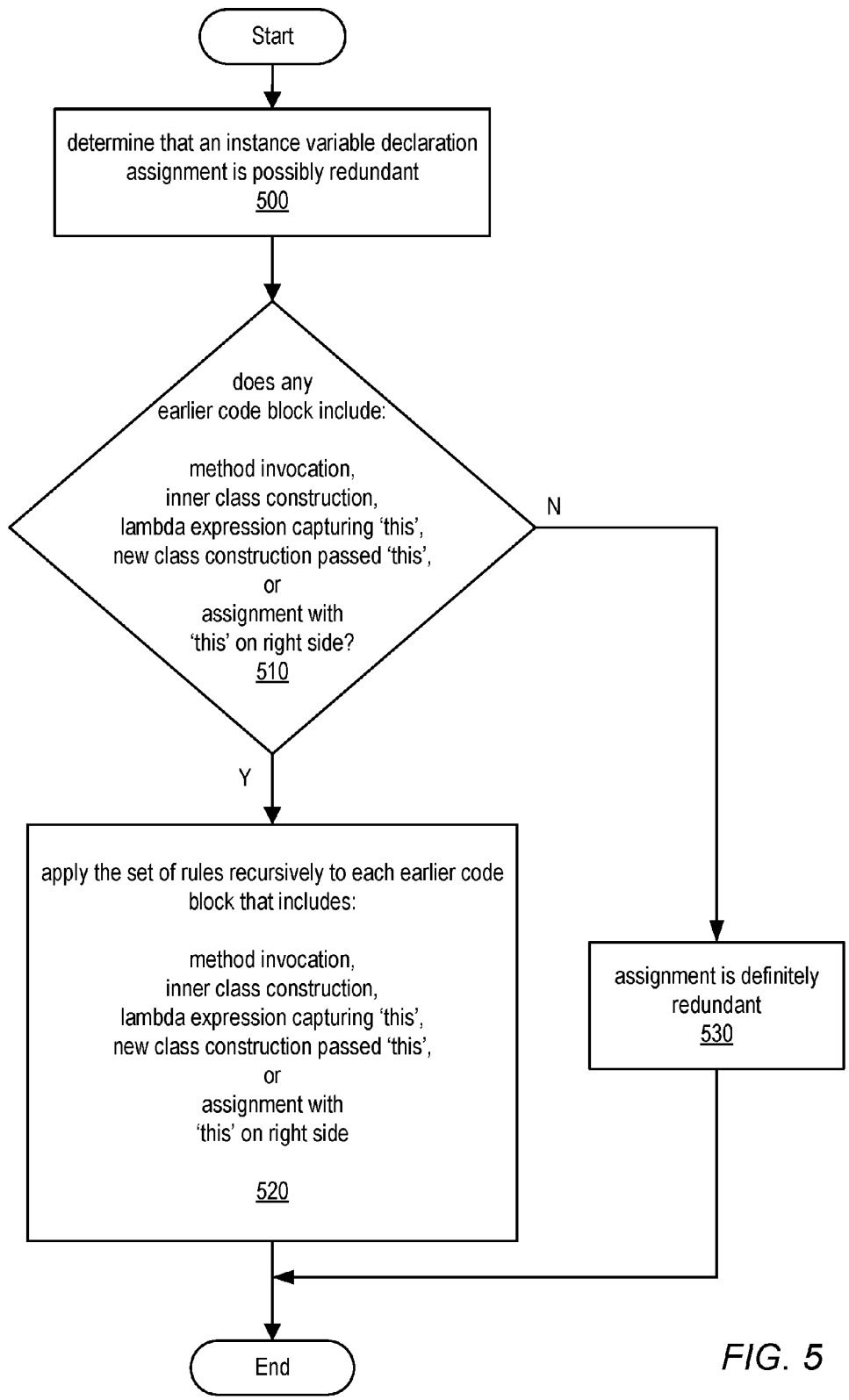
FIG. 5 is a flowchart illustrating one embodiment of a method for determining whether an instance variable declaration assignment is possibly redundant, as described herein.

If, however, the code analyzer 140 determines that the instance variable is not definitely assigned prior to the instance variable declaration, as indicated by the negative output of decision block 310, the code analyzer 140 may determine that the instance variable declaration assignment is possibly redundant, as shown in block 330, and may perform additional analysis in order to determine whether the instance variable declaration assignment is redundant or not, as will be described below regarding FIGS. 4 and 5.

When determining whether an instance variable is assigned prior to its declaration, a code analyzer may analyze, among other things, the instance variables in the source code being compiled. By analyzing each non-final, non-volatile, instance variable that is initialized with its default initial constant value, a code analyzer may determine if the variable is definitely unassigned (or not) at the point of the declaration of the instance variable. Thus, determining whether a variable is definitely redundant may involve determining that there has been no previous assignment of this variable at this particular declaration point.

A code analyzer may be configured to use any of various methods of analysis and/or logic rules (that may be specific to the particular programming language in which the source code was written) to determine whether an instance variable is unassigned prior to its declaration. For example, a code analyzer may examine the code that appears (and executes) before the instance variable declaration to determine whether the variable is assigned a value. In one embodiment, a code analyzer, such as code analyzer 140, may examine the code that executes prior to the instance variable declaration to determine whether the variable (e.g., the variable name) appears on the left-hand side of any assignments. If the variable does not appear on the left-hand side of any assignment, code analyzer 140 may determine that the variable is not assigned a value prior to its declaration and is therefore definitely unassigned (i.e., at the point of the variable's declaration). As another example, code analyzer 140 may use the logic described in the Java Language Specification (e.g., chapter 16) to determine whether the instance variable is definitely unassigned prior to the variable's declaration, in one Java-based embodiment.

Note that as described herein, whether a variable is unassigned prior to its declaration does not refer to it being given its default initial constant value at creation. Thus, code analyzer 140 may determine whether an instance variable is unassigned between the point at which it is created (and given its default initial constant value) and the point at which it is declared, according to an execution order of the source code 120 when executed as compiled code 180.

While code analyzer 140 may utilize language specific rules for determining whether a field is definitely unassigned, as the exact programming structures, constructs, methods, methodologies, etc., that allow a field (e.g., an instance variable) to be modified may vary from language to language and from embodiment to embodiment. Additionally, while analysis rules 150 may include one or more analysis method that define how to determine if a variable is definitely unassigned, there may be other ways in which a variable may be modified that are not covered by the rules configured to determine whether a variable is definitely assigned or definitely unassigned.

If an instance variable is 'definitely unassigned' and there is no potential of its modification (as above), before its declaration, then code analyzer 140 may determine that the instance variable declaration assignment is 'definitely redundant' and compiler 160 may elide the byte codes that perform the assignment from the generated output, without changing the behavior of the program.

Thus, code analyzer 140 may be configured to apply one set of analysis methods or rules to see if a particular instance variable falls into a definitely assigned category or into a definitely unassigned category, but may also determine that an instance variable falls in between these categories. In other words, just because one analysis method may not be able to determine that an instance variable is definitely unassigned, there may be situations in which the variable may be modified that are not covered by those rules.

FIG. 4 is a flowchart illustrating one embodiment of a method for determining the redundancy property of an initial assignment for a possibly unassigned instance variable, as described herein.

As shown in block 400, a code analyzer configured to implement Redundant Instance Variable Initialization Elision, such as code analyzer 140, may determine that an instance variable is possibly unassigned prior to the instance variable's declaration assignment and may further determine whether the source code includes any code blocks that could possibly assign a value to the instance variable prior to the instance variable declaration, as shown in decision block 410.

Note that a code analyzer may determine whether a code block could possibly assign value by examining/analyzing how the code block is currently written in the source code. The term 'could possibly assign' does not refer to the fact that the source code may be modified to include an assignment, but rather that the code block—as currently written in the source code—could possibly assign a value to the instance variable prior to, according to the execution order of the source code when executed, the declaration of the instance variable (e.g., the declaration that includes the initialization or initial assignment).

If, as indicated by the negative output of decision block 410, the code analyzer 140 determines that the source code does not include any code blocks that could possibly assign a value to the instance variable prior to the instance variable declaration, the code analyzer 140 may determine that the assignment is definitely redundant, as shown in block 460. As noted previously, when the code analyzer 140 determines that an instance variable declaration assignment is definitely redundant, it may take any of various types of actions, such as indicating (e.g., by providing a warning, compiler hint, source code comment, etc.) that the assignment is definitely redundant.

If, as indicated by the positive output of decision block 410, the code analyzer 140 determines that the source code includes at least one (e.g., one or more) code blocks that could possibly assign a value to the instance variable prior to the instance variable declaration, the code analyzer 140 may apply a set of rules, such as analysis rules 150, to determine whether any of the code blocks definitely assigns a value to the instance variable prior to the instance variable declaration, as in block 420.

As noted above, code analyzer 140 may apply a set of rules, such as may be part of analysis rules 150, to determine whether an instance variable is definitely assigned prior to the variable's declaration. Code analyzer 140 may examine each method body that may be called from the class constructor to determine whether any instruction modifies the instance variable, according to one embodiment. If a method body (for a method executed prior to the variable's declaration) includes an instruction that modifies the variable (or causes the variable to be modified) code analyzer 140 may determine that the instance variable is definitely assigned prior to its declaration.

If, as indicated by the positive output of decision block 430, the code analyzer 140 determines that at least one code block definitely assigns a value to the instance variable prior to the instance variable declaration, the code analyzer 140 may determine that the instance variable declaration assignment is definitely not redundant, as in block 440.

If, as indicated by the negative output of decision block 430, the code analyzer 140 determines that none of the code blocks definitely assigns a value to the instance variable prior to the instance variable declaration assignment, the code analyzer 140 may determine that the instance variable declaration assignment is possibly redundant, as in block 450.

FIG. 5 is a flowchart illustrating one embodiment of a method for determining whether an instance variable declaration assignment is possibly redundant, as described herein.

As described above, a code analyzer configured to implement Redundant Instance Variable Initialization Elision, such as code analyzer 140, may determine that an instance variable declaration assignment is possibly redundant, as in block 500. For instance, in some embodiments, the code analyzer 140 may not be able to determine, based on the analysis described above regarding FIGS. 3 and 4, whether an instance variable declaration assignment is definitely redundant or definitely not redundant and may thus apply additional analysis to the source code with regard to that particular instance variable declaration assignment in order to attempt to determine a redundancy property (e.g., definitely redundant, definitely not redundant, or possibly redundant) for that particular instance variable declaration assignment.

As illustrated in decision block 510, the code analyzer 140 may be configured to determine whether any earlier code block (e.g., any code block that occurs prior to the instance variable declaration, according to the execution order of the source code) includes certain types of programming instructions, structures, constructions, models, execution paths, etc., that may permit the value of the instance variable to be modified prior to its declaration.

An instance variable may be assigned in a way that is not detectable by the methodology described above regarding determine whether an instance variable is definitely assigned or definitely unassigned prior to its declaration. There are a number of ways in which this can occur, according to various embodiments. For example, according to a Java-based example, if there is one of the following, in left-to-right order in which they appear textually in the source code, before the instance variable declaration, an instance variable may have been modified prior to its declaration:

1. a method invocation; or
2. an inner class construction; or
3. a lambda capturing the 'this' object; or
4. a new class construction being passed 'this'; or
5. an assignment where the right side evaluates to 'this'.

For example, when an inner class in created, a java-based compiler may implicitly pass the inclosing instance to the inner class. Variables in the outer scope may be modified from inside the inner class. The same situation may exist for Lambdas, or for a created class that is passed 'this' as a parameter to the newly created class. Similarly, an instance variable may be modified using an assignment in which right hand side uses 'this'. In general, according to Java-based embodiments, if there is a chance that some block of code will have access to 'this', there is a potential for that code to modify the variable.

Thus, according to a Java-based embodiment, the code analyzer 140 may be configured to determine whether any earlier code block includes a method invocation, an inner class construction, a lambda expression capturing 'this', a new class construction that is passed 'this', or an assignment with 'this' on the right side. While described herein in terms of 'this', in some embodiments according to some programming languages, any block of code that uses an object pointer to the object that includes the instance variable may be used to modify the instance variable and thus may be identified by code analyzer 140 as a block of code that may possibly modify the instance variable.

In additional, code analyzer 140 may also initially determine whether the assigned value is the default initial constant value for the variable's type (as part of the variable's declaration). Thus, in some embodiments, if an instance variable is initialized to a value that is not its default initial constant value, code analyzer 140 may, without performing any additional code analysis regarding that instance variable declaration, determine that the assignment is definitely not redundant and may continue to analyze other instance variable declarations.

While described herein mainly in terms of Java-based examples, Redundant Instance Variable Initialization Elision may be utilized with any of various programming languages according to different embodiments. For instance, when implementing Redundant Instance Variable Initialization Elision, code analyzer 140 may have to analyze source code 120 to identify various situations in which an instance variable may be modified according to the specific nature of the particular programming language.

In general, code analyzer 140 may be configured to determine whether the source code 120 includes any earlier blocks of code, executable prior to the instance variable declaration assignment (according to an execution order for the source code) that comprise any of: a method invocation, a class construction involving the instance variable (e.g., such as an inner class construction), a class construction involving an object that includes the instance variable (e.g., such as an new class construction being passed 'this'), an expression or other instruction involving an object that includes the instance variable (e.g., an expression or instruction that includes 'this'), or that may otherwise access the instance variable directly or via an indirect reference (e.g., aliasing 'this'), according to various embodiments.

If, as indicated by the negative output of decision block 510, no earlier code block includes a method invocation, an inner class construction, a lambda expression capturing 'this', a new class construction that is passed 'this', or an assignment with 'this' on the right side, the code analyzer 140 may determine that the instance variable declaration assignment is definitely redundant, as in block 530.

Alternatively, if the code analyzer 140 determines that any earlier code blocks do include a method invocation, an inner class construction, a lambda expression capturing 'this', a new class construction that is passed 'this', or an assignment with 'this' on the right side, as indicated by the positive output of decision block 510, the code analyzer 140 may apply the set of rules recursively to each earlier code block that includes a method invocation, an inner class construction, a lambda expression capturing 'this', a new class construction that is passed 'this', or an assignment with 'this' on the right side, as shown in block 520.

When recursively applying the set of rules (e.g., analysis rules 150), code analyzer 140 may follow a chain of locations (e.g., within the code) that can potentially (or possibly) change the value of the instance variable. In some embodiments, code analyzer 140 may follow the path from where the variable is initialized to the potential locations (e.g., within the code) where the variable can be mutated and analyze those locations. For example, when determining whether to analyze the body of method, code analyzer 140 may take into account the type of method that is used. For instance, according to a Java-based embodiment, a method call may be private, final, and/or static. Similarly, code analyzer 140 may analyze constructor calls and Lambda instructions.

And we have discussed before, if a method is public, code analyzer 140 may not be able to determine which method body may be executed at runtime due to overriding. Thus, code analyzer 140 may not be able to determine whether an instance variable assignment is redundant or not when a public method is involved (e.g., when a public method is called prior to the instance method is declared).

Therefore, if a method is private and/or final, code analyzer 140 may then examine the body of the method that will be executed and runtime, apply the analysis rules 150 to that method body and determine whether the method body includes any instructions that modify the particular instance variable. Additionally, code analyzer 140 may determine whether the method body includes a method invocation, an inner class construction, a lambda expression capturing 'this', a new class construction that is passed 'this', or an assignment with 'this' on the right side, and if so, apply the analysis rules 150 recursively to those situations as well, according to some embodiments.

Similarly, if a method is static, behavior of a static method call may not ever be dependent on runtime, according to a java-based example. Therefore, if a method is static, code analyzer 140 may then examine the body of the method that will be executed and runtime, apply the analysis rules 150 to that method body and determine whether the method body includes any instructions that modify the particular instance variable. As with private and/or final methods, code analyzer 140 may also determine whether the body of a static method includes a method invocation, an inner class construction, a lambda expression capturing 'this', a new class construction that is passed 'this', or an assignment with 'this' on the right side, and if so, apply the analysis rules 150 recursively to those locations, according to some embodiments.

Similarly, when code analyzer 140 encounters inner class constructions, lambda expressions, new class constructions, or other instructions (e.g., assignments) that involve 'this', code analyzer 140 may attempt to examine those instructions, expressions and/or classes to determine and recursively apply the analysis rules 150, according to some embodiments. For example, in a Java-based embodiment, if code analyzer 140 identifies an assignment where the right side includes the 'this' token, code analyzer 140 may store the variable name on the left side and continue analyzing replacing the 'this' token with the variable name.

Thus, code analyzer 140 may identify bodies of code proceeding (e.g., in execution order) the instance variable declaration that could potentially (or possibly) assign a value to the variable, and may analyze each of the bodies to determine if the instance variable is 'definitely unassigned'. For instance, in a Java-based embodiment, code analyzer 140 may be configured to use the analysis of Definite Assignment of variables provided in the Java Language Specification, recursively.

Code analyzer 140 may then analyze each of the identified code bodies to determine if the instance variable is 'definitely unassigned', as described above. During analysis of the identified bodies, code analyzer 140 may encounter other code bodies that could possibly assign a value to the variable and if so, may identify those code bodies to be recursively analyzed. For example, in a Java-based embodiment, code analyzer 140 may be configured to determine whether a code body includes a method invocation, an inner class construction, a lambda expression capturing 'this', a new class construction that is passed 'this', or an assignment with 'this' on the right side.

Code analyzer 140 may continue to identify and analyze bodies of code that could possibly modify the instance variable recursively until no more bodies are identified that can be analyzed are found. If code analyzer 140 encounters a dynamic method invocation (e.g., an instance method invocation that is not one of a private and/or final method) is found during the analysis, code analyzer 140 may stop its analysis of the particular instance variable, and may determine that it may not be possible to definitely determine whether the instance variable's initialization assignment is redundant or not, according to some embodiments.

If, after examining and analyzing all the possible locations recursively, code analyzer 140 does not encounter a reference to the instance variable and also does not encounter a situation that prevents analysis (e.g., a public or overridable method), code analyzer 140 may then determine that the instance variable assignment is definitely redundant.

Thus, as noted previously, Redundant Instance Variable Initialization Elision, as described herein, may, according to various embodiments, identify three different categories of instance variable initialization assignment: 1) definitely redundant and it can be safely omitted from a compiled version of the code, 2) definitely not redundant because the code analyzer encounters a modification to the instance variable and no warnings may be generated, 3) possibly redundant where it is not possible to determine statically that there is no modification to the instance variable, but in which there may not actually be a modification to the instance variable at runtime.

Figure 6:
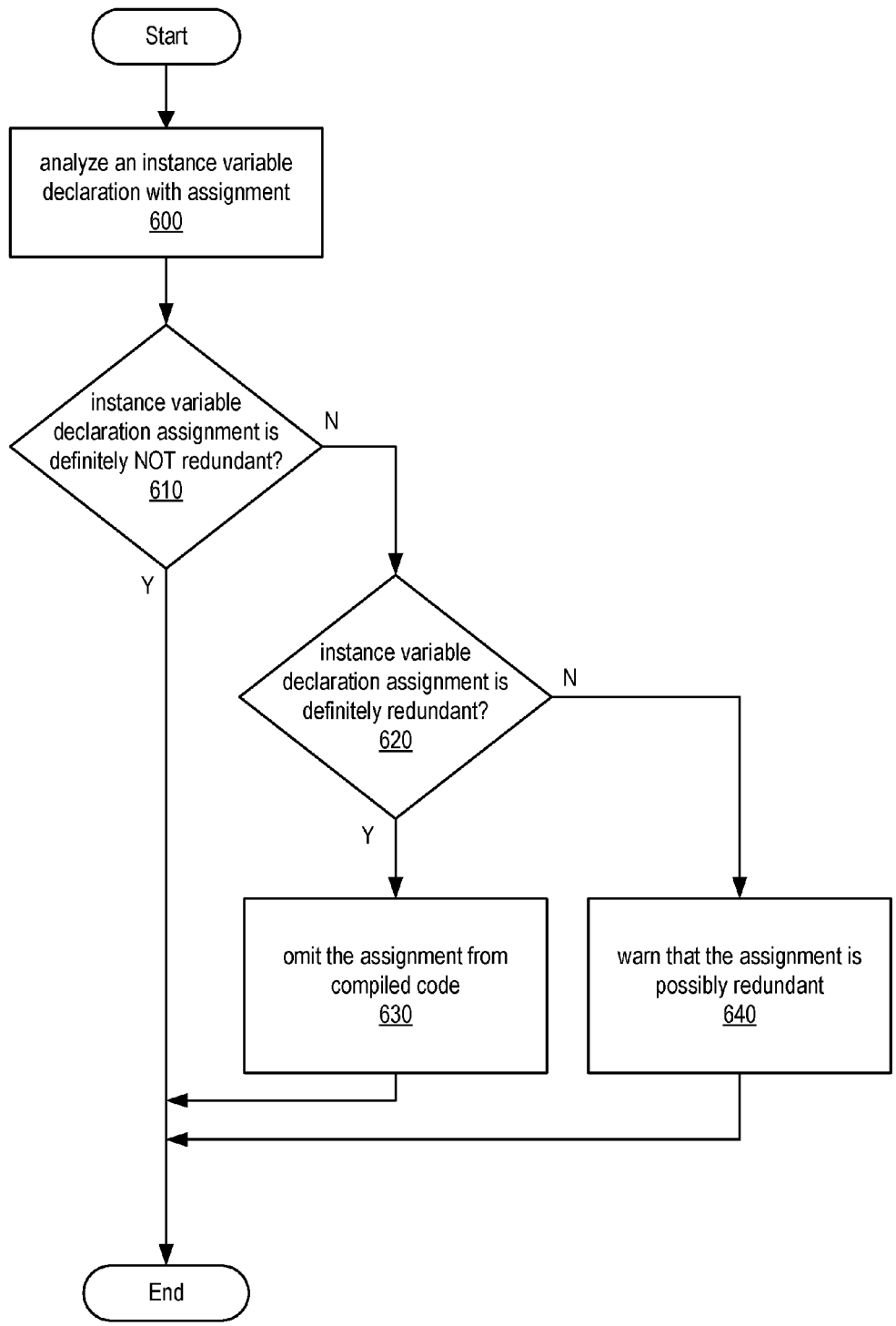
FIG. 6 is a flowchart illustrating one embodiment of a method for Redundant Instance Variable Initialization Elision, as described herein.

FIG. 6 is a flowchart illustrating one embodiment of a method for Redundant Instance Variable Initialization Elision, as described herein. The flowchart illustrated in FIG. illustrates, at a high level, the overall outcome of applying Redundant Instance Variable Initialization Elision according to some embodiments. Thus, as described above, a code analyzer 140 may analyze instance variable declaration with an assignment to determine whether that assignment is redundant or not, as shown in block 600.

If code analyzer 140 is able to determine that the instance variable declaration assignment is definitely not redundant, as indicated by the positive output of decision block 610, code analyzer may not generate any warnings, hints, etc. For instance, the assignment may assign a value to the variable that is not equal to the variable's default initial constant value or code analyzer may have been able to positively determine that the instance variable was modified prior to its declaration. Thus, the positive output of decision block 610 may be considered to correspond to the second category of assignments described above.

If code analyzer 140 is not able to determine that the assignment is definitely not redundant, code analyzer 140 may then determine whether the instance variable declaration assignment is definitely redundant, as shown in decision block 620. For instance, code analyzer 140 may analyze one or more bodies of code that may possibly modify the instance variable and recursively apply analysis rules 150 to each body, as described above. If, as indicated by the positive output of decision block 630, code analyzer 140 determines that the instance variable declaration assignment is definitely redundant, code analyzer 140 may then cause the assignment to be omitted from the compiled code, as in block 630. For instance, code analyzer 140 may communicate with compiler 160, such as via one or more compiler hints, redundancy reports, etc., such that compiler 160 may omit that particular assignment from compiled code 180 when compiling source code 120. Thus, the positive output of decision block 620 may be considered to correspond to the first category of assignments described above.

However, if code analyzer 140 determines that the instance variable declaration assignment is neither definitely redundant nor definitely not redundant, as indicated by the negative output of decision block 620, code analyzer 140 may indicate, issue a warning, or otherwise communicate that the assignment is possibly redundant, as shown in block 640. For instance, while applying analysis rules 150, code analyzer 140 may have encountered an overridable method invocation and thus was unable to determine with certainty whether a particular instance variable assignment was definitely redundant or definitely not redundant. Thus, the negative output of decision block 640 may be considered to correspond to the third category of assignments described above.

Figure 7:
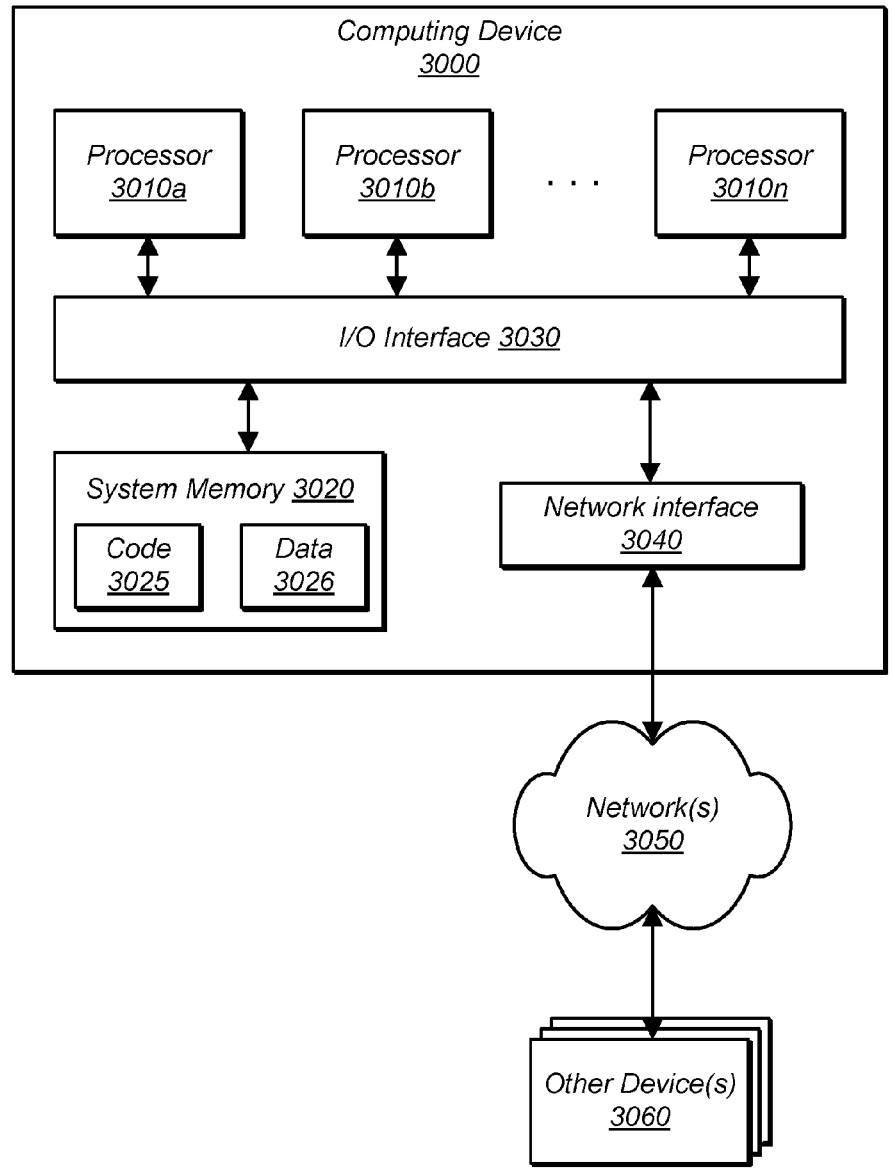
FIG. 7 illustrates an example computing device suitable to implement Redundant Instance Variable Initialization Elision, according to some embodiments.

In at least some embodiments, a computer system that implements a portion or all of one or more of the technologies described herein may include a general-purpose computer system that includes or is configured to access one or more computer-readable media. FIG. 7 illustrates such a general-purpose computing device 3000 suitable for implementing the method, features and enhancements described herein. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026. For example, memory 3020 and well as code 3025 and data 3026 may store, in one embodiment, program instructions and data for implementing integrated development environment 100, code analyzer 140 and/or compiler 160, described above.

In various embodiments, integrated development environment 100, code analyzer 140 and/or compiler 160 (and/or any individual sub-modules thereof) may each be implemented in any of various programming languages or methods. For example, in one embodiment, integrated development environment 100, code analyzer 140 and/or compiler 160 may be written in any of the Java, C, C++, assembly, or other general purpose programming languages, while in another embodiment, one or more of them may be written using a different, more specialized, programming language. Moreover, in some embodiments, integrated development environment 100, code analyzer 140 and/or compiler 160 (and/or various sub-modules thereof) may not be implemented using the same programming language.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example.

In some embodiments, system memory 3020 may be one embodiment of a computer-readable (e.g., computer-accessible) medium configured to store program instructions and data as described above with respect to FIGS. 1-6 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory.

Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium or upon a computer-readable storage medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. For example, actions, processes, methods, tasks or functions described herein as being performed by code analyzer 140 may, in some embodiments, be performed by compiler 160 and vice versa. Additionally, functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of examples that follow. Finally, structures and functionality presented as discrete components in the exemplary configurations may be implemented as a combined structure or component.

The various methods as illustrated in the figures and described herein represent example embodiments of methods. The methods may be implemented in software, hardware, or a combination thereof. The order of method may be changed, and various elements may be added, reordered, combined, omitted, modified, etc.

Although the embodiments above have been described in detail, numerous variations and modifications will become apparent once the above disclosure is fully appreciated. Various modifications and changes may be made as would be obvious to a person skilled in the art having the benefit of this disclosure. It is intended that the invention embrace all such modifications and changes and, accordingly, the above description to be regarded in an illustrative rather than a restrictive sense. Furthermore, it is intended that the following claims be interpreted to embrace all such variations and modifications.

What is claimed is:

1. A non-transitory, computer-readable storage medium storing program instructions that when executed on a computing device cause the computing device to perform:
implementing a code analyzer configured to:
access source code;
identify, within the source code, an instance variable declaration comprising an assignment that assigns a value to an instance variable;
determine whether the assigned value is a default value for the instance variable;
apply, based at least in part on determining that the assigned value is a default value for the instance variable, a set of rules to determine whether the instance variable declaration assignment is definitely redundant with respect to the default value; and
indicate, based at least in part on determining that the instance variable declaration assignment is definitely redundant, that the instance variable declaration assignment is definitely redundant.

2. The non-transitory, computer-readable storage medium of claim 1, wherein the code analyzer is further configured to:
determine that the assigned value is not the default value for the instance variable; and
in response to determining that the assigned value is not the default value, determine that the instance variable declaration assignment is definitely not redundant with respect to the default value such that no indication is made regarding the instance variable declaration assignment being definitely redundant.

3. The non-transitory, computer-readable storage medium of claim 1, wherein to apply the set of rules, the code analyzer is configured to:
determine whether the instance variable is assigned a value prior to the instance variable declaration assignment according to an execution order of the source code.

4. The non-transitory, computer-readable storage medium of claim 3, wherein the code analyzer is further configured to:
determine, based at least in part on determining that the instance variable is assigned a value prior to the instance variable declaration assignment, that the instance variable declaration is definitely not redundant with respect to the default value.

5. The non-transitory, computer-readable storage medium of claim 1, wherein to determine whether the instance variable declaration assignment is definitely redundant, the code analyzer is further configured to:
determine whether the source code includes one or more earlier blocks of code, executable prior to the instance variable declaration assignment according to an execution order of the source code, that assign a value to the instance variable; and
determine, based at least in part on determining that the source code does not include one or more earlier blocks of code that assign a value to the instance variable, that the instance variable declaration assignment is definitely redundant with respect to the default value.

6. The non-transitory, computer-readable storage medium of claim 1, wherein to determine whether the instance variable declaration assignment is definitely redundant, the code analyzer is further configured to:
determine whether the source code includes one or more earlier blocks of code, executable prior to the instance variable declaration assignment according to an execution order of the source code, that possibly assign a value to the instance variable; and
apply, based at least in part on determining that the source code includes one or more earlier blocks of code that possibly assigns a value to the instance variable, the set of rules to each of the one or more earlier blocks of code to determine whether the one or more earlier blocks of code assign a value to the instance variable.

7. The non-transitory, computer-readable storage medium of claim 6, wherein the code analyzer is further configured to:
determine, based at least in part on applying the set of rules to each of the one or more earlier blocks of code, that none of the one or more earlier blocks of code assign a value to the instance variable; and
determine, based at least in part on determining that none of the one or more earlier blocks of code assign a value to the instance variable, that the instance variable declaration is definitely redundant with respect to the default value.

8. The non-transitory, computer-readable storage medium of claim 6, wherein the code analyzer is further configured to:
determine, based at least in part on applying the set of rules to each of the one or more earlier blocks of code, that at least one of the one or more earlier blocks of code assigns a value to the instance variable; and
determine, based at least in part on determining that the at least of the one or more earlier blocks of code assigns a value to the instance variable, that the instance variable declaration is definitely not redundant with respect to the default value.

9. The non-transitory, computer-readable storage medium of claim 6, wherein to determine whether the source code includes one or more earlier blocks of code that possibly assign a value to the instance variable, the code analyzer is further configured to:
determine whether the source code includes any earlier blocks of code, executable prior to the instance variable declaration assignment according to an execution order for the source code, that comprise any of:
a method invocation;
a class construction involving the instance variable;
a class construction involving an object that includes the instance variable;
an expression involving the object that includes the instance variable; or
an instruction involving the object that includes the instance variable.

10. The non-transitory, computer-readable storage medium of claim 1, wherein the code analyzer is further configured to:
determine that the source code includes one or more earlier blocks of code, executable prior to the instance variable declaration assignment according to an execution order of the source code, that possibly assign a value to the instance variable;
apply the set of rules to each of the one or more earlier blocks of code;
determine, based at least in part on applying the set of rules to each of the one or more earlier blocks of code, that it cannot be determined, for at least one of the one or more earlier blocks of code, whether the at least one earlier block of code assigns a value to the instance variable declaration assignment; and indicate that it cannot be determined whether the instance variable declaration assignment is definitely redundant with respect to the default value.

11. The non-transitory, computer-readable storage medium of claim 1, wherein the code analyzer is further configured to:

include a compiler hint in the source code indicating that the instance variable declaration assignment should not be included in a compiled version of the source code.

12. A computing device, comprising:
a processor; and
a memory comprising program instructions, that when executed on the processor cause the processor to implement a code analyzer configured to:
access source code;
identify, within the source code, an instance variable declaration comprising an assignment that assigns a value to an instance variable;
determine whether the assigned value is a default value for the instance variable;
apply, based at least in part on determining that the assigned value is a default value for the instance variable, a set of rules to determine whether the instance variable declaration assignment is definitely redundant with respect to the default value; and
indicate, based at least in part on determining that the instance variable declaration assignment is definitely redundant, that the instance variable declaration assignment is definitely redundant.

13. The computing device of claim 12, wherein to determine whether the instance variable declaration assignment is definitely redundant, the code analyzer is further configured to:

determine that the instance variable is assigned a value prior to the instance variable declaration according to an execution order of the source code; and
in response to determining that the instance variable is assigned a value prior to the instance variable declaration, determine that the instance variable is definitely not redundant with respect to the default value such that no indication is made regarding the instance variable declaration assignment being definitely redundant.

14. The computing device of claim 12, wherein to determine whether the instance variable declaration assignment is definitely redundant, the code analyzer is further configured to:

determine whether the source code includes one or more earlier blocks of code, executable prior to the instance variable declaration assignment according to an execution order of the source code, that assign a value to the instance variable; and
determine, based at least in part on determining that the source code does not include one or more earlier blocks of code that assign a value to the instance variable, that the instance variable declaration assignment is definitely redundant with respect to the default value.

15. The computing device of claim 12, wherein to determine whether the instance variable declaration assignment is definitely redundant, the code analyzer is further configured to:

determine whether the source code includes one or more earlier blocks of code, executable prior to the instance variable declaration assignment according to an execution order of the source code, that possibly assign a value to the instance variable; and
apply, based at least in part on determining that the source code includes one or more earlier blocks of code that possibly assign a value to the instance variable, the set of rules to each of the one or more earlier blocks of code to determine whether the one or more earlier blocks of code assign a value to the instance variable.

16. The computing device of claim 15, wherein the code analyzer is further configured to:

determine, based at least in part on applying the set of rules to each of the one or more earlier blocks of code, that none of the one or more earlier blocks of code assign a value to the instance variable; and
determine, based at least in part on determining that none of the one or more earlier blocks of code assign a value to the instance variable, that the instance variable declaration is definitely redundant with respect to the default value.

17. The computing device of claim 15, wherein the code analyzer is further configured to:

determine, based at least in part on applying the set of rules to each of the one or more earlier blocks of code, that at least one of the one or more earlier blocks of code assigns a value to the instance variable; and
determine, based at least in part on determining that the at least of the one or more earlier blocks of code assigns a value to the instance variable, that the instance variable declaration is definitely not redundant with respect to the default value.

18. The computing device of claim 12, wherein to determine whether the source code includes one or more earlier blocks of code that possibly assign a value to the instance variable, the code analyzer is further configured to:

determine whether the source code includes any earlier blocks of code, executable prior to the instance variable declaration assignment according to an execution order for the source code, that comprise any of:
a private or final instance method invocation on an object pointer to an object that includes the instance variable;
a stable method invocation that receives an object pointer to an object that includes the instance variable;
an inner class construction involving the instance variable;
a lambda expression that captures an object pointer to an object that includes the instance variable; or
a new class construction that receives an object pointer to an object that includes the instance variable.

19. The computing device of claim 12, wherein the program instructions further cause the computing device to:
implement a compiler configured to:
compile the source code to generate a compiled version of the source code; and
omit, in response to the indication that the instance variable declaration assignment should not be included in a compiled version of the source code, the instance variable declaration assignment from the compiled version of the source code.

20. A computer implemented method, comprising:
accessing, by a code analyzer, source code;
identifying within the source code, by the code analyzer, an instance variable declaration comprising an assignment that assigns a value to an instance variable;
determining, by the code analyzer, whether the assigned value is a default value for the instance variable;

applying, by the code analyzer based at least in part on determining that the assigned value is a default value for the instance variable, a set of rules to determine whether the instance variable declaration assignment is definitely redundant with respect to the default value; and indicating, by the code analyzer based at least in part on determining that the instance variable declaration assignment is definitely redundant, that the instance variable declaration is definitely redundant.

21. The computer implemented method of claim 20, further comprising:

including a compiler hint in the source code indicating that they instance variable declaration assignment should not be included in a compiled version of the source code.

22. The computer implemented method of claim 20, further comprising:

eliding the instance variable declaration assignment.

23. The computer implemented method of claim 20, further comprising:

reporting a warning that the instance variable declaration assignment is redundant.

\* \* \* \* \*

UNITED STATES PATENT AND TRADEMARK OFFICE
CERTIFICATE OF CORRECTION

PATENT NO. : 10,127,133 B2
APPLICATION NO. : 15/094783
DATED : November 13, 2018
INVENTOR(S) : Hegarty et al.

Page 1 of 1

It is certified that error appears in the above-identified patent and that said Letters Patent is hereby corrected as shown below:

In the Specification

In Column 4, Line 48, delete "or and" and insert -- or/and --, therefor.

In the Claims

In Column 27, Line 14, in Claim 21, delete "they" and insert -- the --, therefor.

Signed and Sealed this
Twenty-ninth Day of October, 2019

Andrei Iancu
*Director of the United States Patent and Trademark Office*